April 18, 1933.   W. GUMPRICH   1,904,446
POSITIONING MEANS FOR POISE WEIGHTS
Filed Feb. 15, 1929
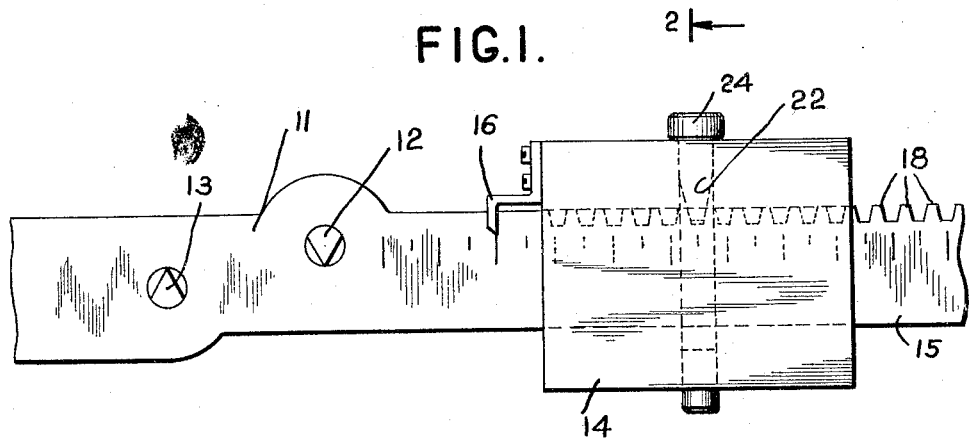
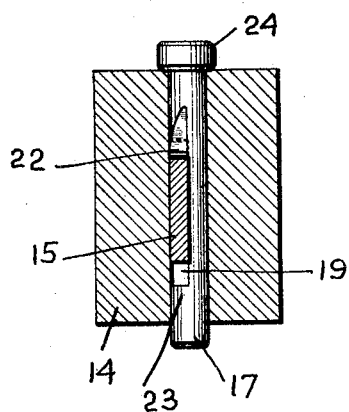 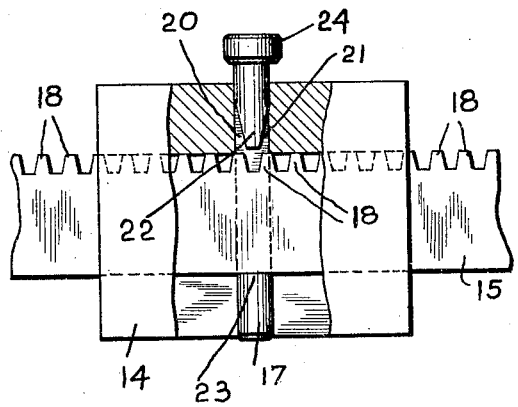
Inventor
William Gumprich
By his Attorney
W. M. Wilson Patented Apr. 18, 1933

1,904,446

UNITED STATES PATENT OFFICE

WILLIAM GUMPRICH, OF BROOKLYN, NEW YORK, ASSIGNOR TO DAYTON SCALE COMPANY, OF DAYTON, OHIO, A CORPORATION OF NEW JERSEY

POSITIONING MEANS FOR POISE WEIGHTS

Application filed February 15, 1929. Serial No. 340,154.

The present invention relates to weighing scales and more particularly to positioning means for a poise weight upon a scale beam.

It is the main object of this invention to provide a new and very simple positioning arrangement for the purpose described.

Another object of the invention is to position a poise weight, slidably mounted upon a beam, by means of a pin passing through said poise weight and coacting with said beam.

Other objects and advantages of the invention will be set forth in the accompanying specification and will be seen from the accompanying drawing in which shows:

Fig. 1 a front elevation of the scale beam and the poise weight associated therewith.

Fig. 2 is a sectional view taken on line 2—2 of Fig. 1.

Fig. 3 shows a part of the beam and the poise weight the latter with a broken away front portion to illustrate more clearly the positioning means.

In Fig. 1 the scale beam is designated at 11 and is provided with a knife edge 12 which rests on each side of said beam in bearings attached to the frame of the weighing scale. On the left side the beam is provided with other knife edges 13 which carry a stirrup of the load supporting elements. Since all this structure is well known in the scale art and does not concern the scope of the present invention it is not illustrated in the accompanying drawing. Upon the right hand arm 15 of the beam there is provided a poise weight 14 having a slot through which this arm passes. The arm 15 fits accurately into said slot so as to permit the poise weight 14 slidable movement in linear direction only. To weight 14 is attached an indicator 16 which coacts with graduations provided on arm 15. The adjusting and positioning means for this poise weight will now be described more in detail.

Arm 15 is provided on its upper edge with a plurality of teeth 18. Weight 14 has a vertical hole into which fits a pin 17 having a flattened recess portion 19. The slot in weight 14 and said hole are arranged in such a way that arm 15 fits exactly into the recess portion of pin 17 as will be clearly seen from the drawing. The recess 19 is of sufficient height to permit sliding of weight 14 along bar 15 when pin 17 is in lifted position as shown in Fig. 3. Recess 19 extends upwardly into two recess sections 20 and 21, thus forming a tooth 22 on the pin 17 which tooth is in the same plane as the arm 15. Tooth 22 is adapted to fit into the spaces between teeth 18 in order to position the poise weight properly in any adjusted position but it will be understood that only the sides of tooth 22 coact with two adjacent teeth, while the lower terminal of tooth 22 does not touch the bottom of the space between the aforesaid teeth, so that accurate positioning is secured.

When the parts are being assembled pin 17 is inserted in weight 14 and then the weight is slid over arm 15 so that this arm passes into recess 19. It will be recognized that in this position the pin cannot be removed from the weight in view of portion 23 of the pin on the one hand and of the button 24 on the other hand. When the weight 14 is in adjusted position, pin 17 is lowered and tooth 22 fits into the space between two teeth 18 and prevents movement of the weight in either direction. When the operator wants to adjust the weight to another position he lifts the pin 17 by pressing its lower portion below the weight whereupon the weight is free to move along arm 15. In the new position the operator releases pin 17 so that it may drop into the space of teeth or for safety the operator may push down on the upper part of the pin so as to ascertain proper and positive adjustment which is secured if the button 18 is in the position shown in Figs. 1 and 2.

While there is shown and described a preferred embodiment of the invention it will be understood that different constructions may be provided without departing from the scope of the invention and I intend to be limited only by the scope of the following claims:

1. A scale beam having a toothed portion, a poise weight slidably mounted upon said scale beam, an element carried by said poise weight, said element having a recess accommodating said beam and for guiding movement of said element transversely of the beam, and a tooth to coact with said toothed portion to position said poise weight upon said beam.

2. A scale beam having an arm with a toothed portion, a poise weight having a slot accommodating said scale beam, said poise weight having also a hole accommodating a pin and said pin having a recess for accommodating said arm and having a tooth for coacting with said toothed portion to position said poise weight upon said beam.

3. A device comprising a beam, a poise movable thereon, and an element carried by the poise and having a retaining end for engaging the beam to hold the poise in adjusted position, said element having a flat wall at an angle to the retaining end in continual engagement with a side of the beam to prevent rotative movement of the element relative to the beam.

4. A scale beam having a toothed portion, a poise adjustably movable longitudinally of said scale beam and provided with an element coacting with the toothed portion to hold the poise in adjusted position on said beam and releasable from the toothed portion by a movement transverse of the scale beam, said transverse movement being restricted by the edge of the scale beam opposite the toothed portion.

5. A scale beam having a toothed portion along its upper edge, a poise adjustable longitudinally of said beam, and an element carried by said poise and coacting with the toothed portion to hold the poise in adjusted position on said beam, said element being releasable from the toothed portion by a movement transverse of the beam and restricted in its releasing movement by engagement with the scale beam.

6. In combination, a scale beam having a series of notches along one edge, a poise adjustably movable longitudinally of the scale beam, and a freely movable element mounted in said poise for retaining the poise in adjusted position on said beam, said element having a projection cooperating with a notch in the beam for preventing longitudinal movement of the poise and disengageable from said notch by a movement transverse of the scale beam, a portion of said element being adapted to cooperate with the edge of the scale beam opposite the notches to limit transverse movement of the element to an extent sufficient to disengage the projection from the cooperating notch.

7. In combination, a scale beam having a toothed portion along the upper edge, a poise adjustably movable longitudinally of the scale beam, and an element mounted in said poise for retaining the poise in adjusted position on said beam, said element having a projection cooperable with a tooth space in the beam for preventing longitudinal movement of the poise and disengageable from said tooth space by a vertical movement transverse of the scale beam, said element having a portion coacting with the underside of the scale beam to limit such transverse movement to an amount sufficient to permit said projection to clear the teeth on the scale beam.

8. In combination, a scale beam having a toothed portion, a poise adjustably movable longitudinally of the beam, and an element mounted in said poise for vertical movement transversely of the scale beam, said element having a projection cooperable with a tooth space of the beam to hold the poise in adjusted position and disengageable from the toothed portion by manual pressure on the lower end of the element, said element having a part cooperating with the scale beam to limit such vertical movement of the element to an amount sufficient to disengage the projection from the cooperating tooth space on the beam.

9. In combination, a scale beam provided with teeth along one edge, a poise adjustable longitudinally of said beam, and an element carried by the poise and having a recess embracing said beam, one side of said recess being adapted to engage in locking relation the toothed portion of the beam to retain the poise in adjusted position on said beam and the opposite side of said recess being adapted to permit a limited movement of said element to render ineffective the locking relation of said element with the scale beam whereby to permit adjustment of the poise longitudinally of the beam.

10. In combination, a poise adapted to be adjustably mounted in a scale beam, and an element carried by the poise having a recess adapted to embrace the scale beam, one portion of the last named recess being adapted to coact with the scale beam to lock the poise against longitudinal movement relative to the scale beam and another portion of said last named recess being adapted to engage the scale beam and spaced therefrom to permit a limited movement of the element relative to the poise to disable the locking connection of the element with the scale beam.

11. The combination, a scale beam having locking projections along one side thereof, a poise adjustable longitudinally of said beam, and an element carried by the poise and cooperating with the locking projections to retain the poise in adjusted position on said beam, said element being releasable by a movement transverse of the scale beam and having a shoulder limiting such releasing movement.

12. In combination, a scale beam, a poise longitudinally adjustable on said beam, and a freely movable element carried by the poise and adapted to have a locking relation with the scale beam to hold the poise in adjusted position, said element being releasable from said locking relation by a movement transverse of the poise and having a shoulder limiting said transverse releasing movement.

13. A device comprising a toothed scale beam, a poise adjustably mounted thereon and having an index co-operating with graduations in the scale beam corresponding to the teeth formed in the latter, and an element slidably carried by the poise and having a tooth portion adapted to co-operate with said teeth to hold the poise in adjusted position, said element having rigid therewith a portion adapted to be manually directly engaged to positively force the toothed portion of the element into coaction with the teeth in the beam.

14. In combination with a scale beam having aligning notches formed therein, a poise adjustably mounted on said beam and provided with an index adapted to cooperate with graduations on the beam, each graduation corresponding to one of said notches, and an element freely mounted in said poise for movement relative to the latter to lock the poise in adjusted position with the index opposite a desired graduation on the beam, said element having a recess for accommodating the beam and having a locking portion at one side of the recess adapted to co-operate with the notch corresponding to the desired graduation to forcibly align the index and desired graduation by manual pressure on said element and having a wall at the other side of the recess for limiting releasing movement of the element.

In testimony whereof I hereto affix my signature.

WILLIAM GUMPRICH.